United States Patent [19]

Hansen

[11] Patent Number: 4,643,586

[45] Date of Patent: Feb. 17, 1987

[54] EQUIPMENT AND METHOD FOR CALIBRATION OF INSTRUMENTS HAVING A TEMPERATURE SENSING UNIT

[76] Inventor: Jens S. Hansen, 232, Gl. Strandvej, DK-3050 Humlebaek, Denmark

[21] Appl. No.: 754,814

[22] Filed: Jul. 12, 1985

Related U.S. Application Data

[63] Continuation-in-part of Ser. No. 457,491, Jan. 12, 1983, abandoned.

[51] Int. Cl.⁴ .............................................. G01K 15/00
[52] U.S. Cl. .......................................... 374/1; 374/179
[58] Field of Search ................... 374/1, 56; 219/10.77

[56] References Cited

U.S. PATENT DOCUMENTS

| | | | |
|---|---|---|---|
| 2,422,734 | 6/1947 | Jung | 374/185 X |
| 2,962,680 | 11/1960 | Sidaris | 374/185 X |
| 2,993,363 | 7/1961 | Howell | 374/1 |
| 3,377,838 | 4/1968 | Kanazawa et al. | 374/56 |
| 3,699,800 | 10/1972 | Waldron | 374/1 |
| 3,738,174 | 6/1973 | Waldron | 374/1 |
| 3,939,687 | 2/1976 | Waldron | 374/1 |
| 4,396,818 | 8/1983 | Kominami et al. | 219/10.77 |
| 4,541,731 | 9/1985 | Comey et al. | 374/1 X |

Primary Examiner—Daniel M. Yasich
Attorney, Agent, or Firm—Tilton, Fallon, Lungmus

[57] ABSTRACT

An equipment for the calibration of a temperature sensing device comprises an HF-induction coil capable of generating an alternating magnetic field which produces heat in the device to be calibrated. The actual temperature of the device is measured by a thermocouple attached directly to the surface of said device.

16 Claims, 8 Drawing Figures

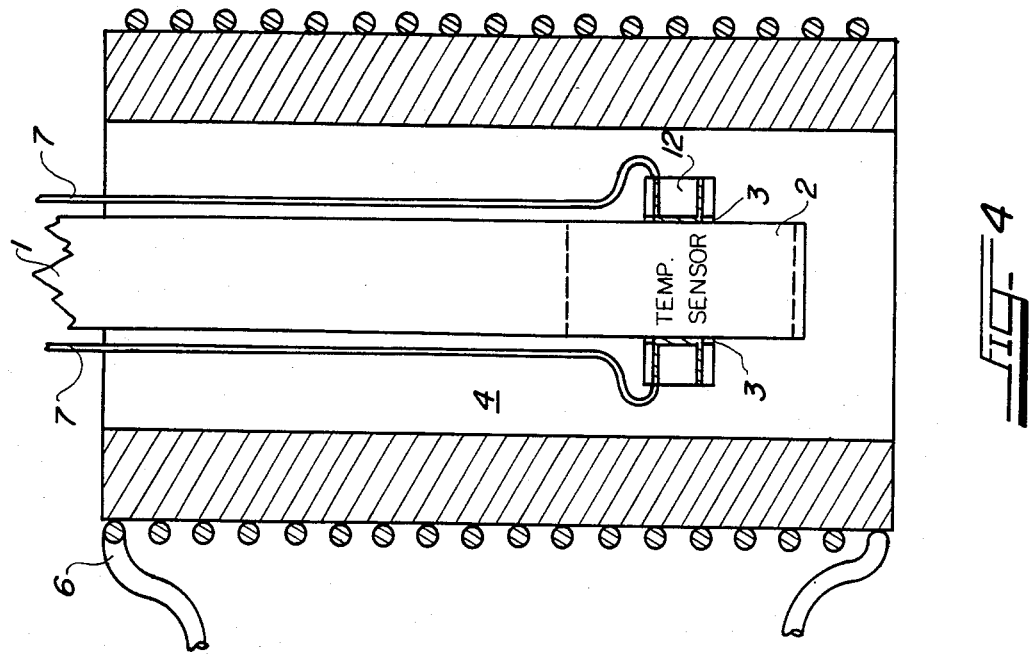
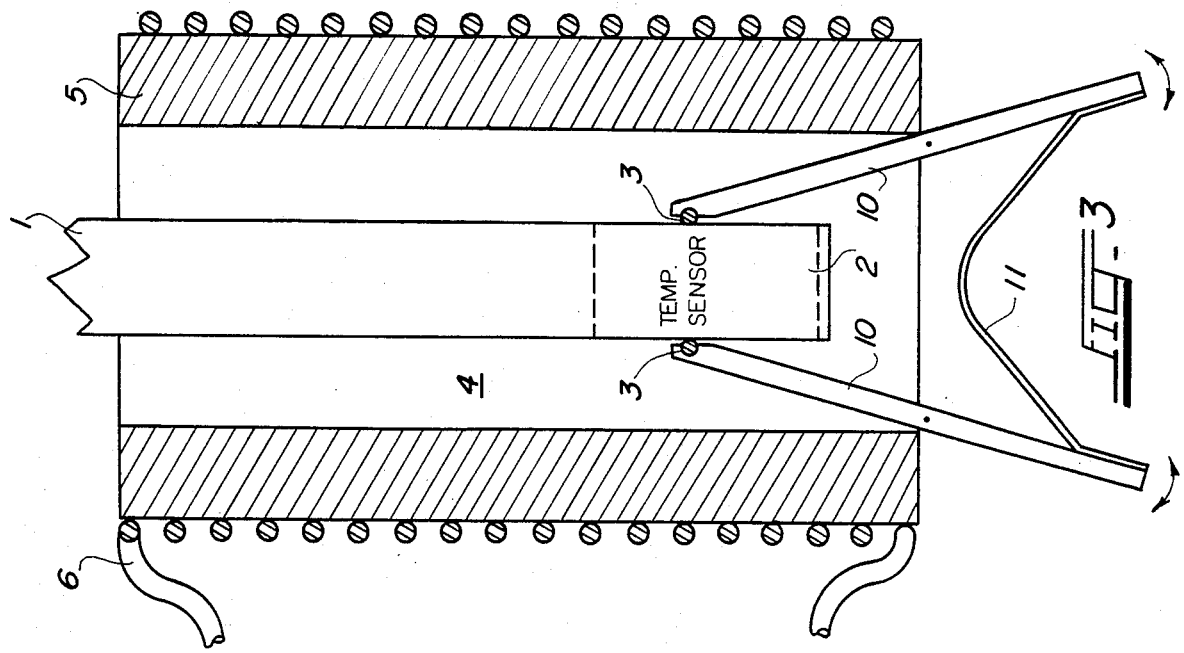

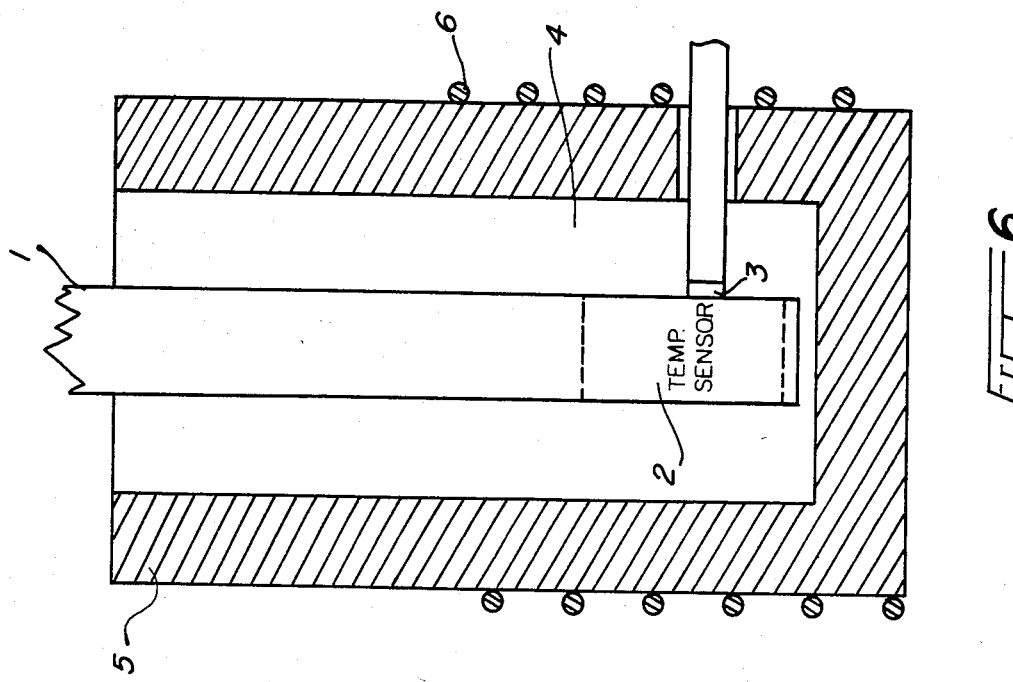
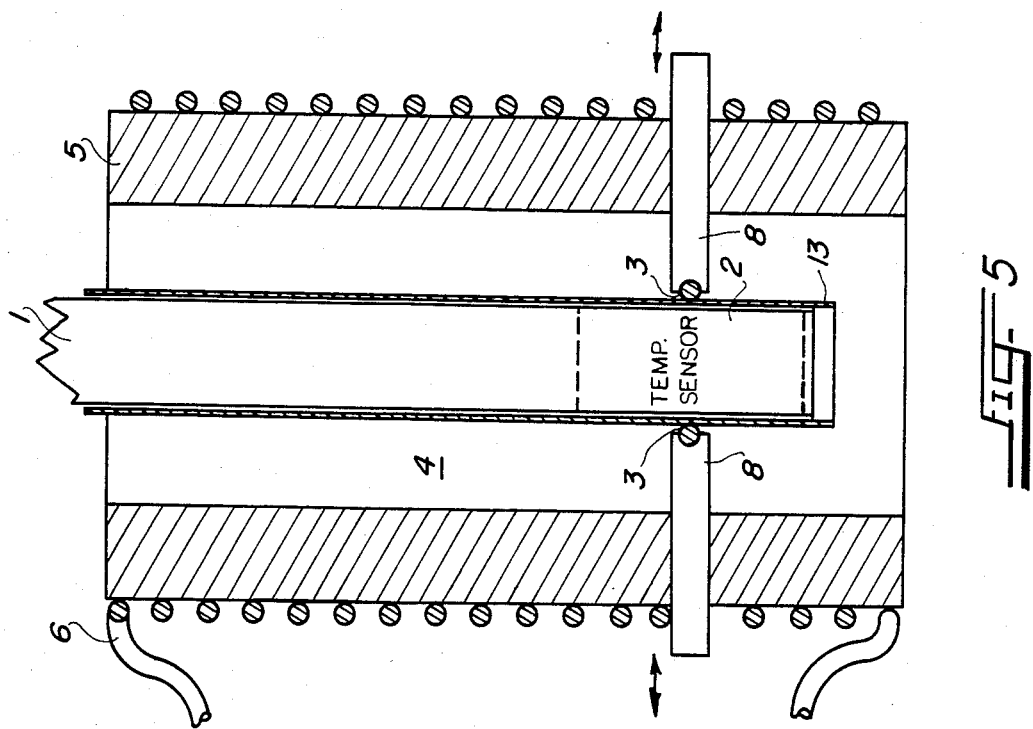

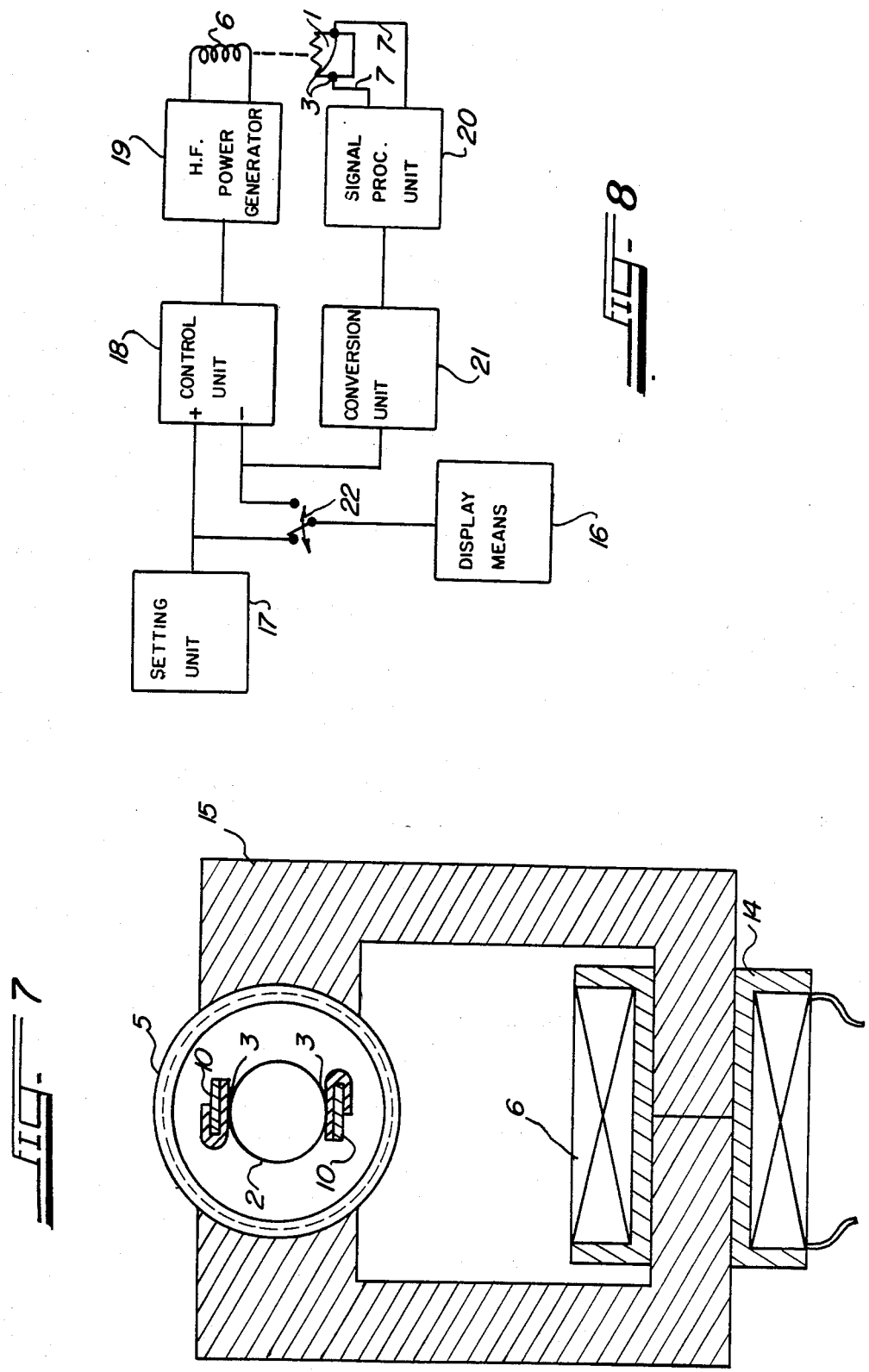

EQUIPMENT AND METHOD FOR CALIBRATION OF INSTRUMENTS HAVING A TEMPERATURE SENSING UNIT

RELATED APPLICATION

This application is a continuation-in-part of co-pending application Ser. No. 457,491 filed Jan. 12, 1983 and now abandoned.

BACKGROUND OF THE INVENTION

The present invention relates to equipment for the calibration of instruments having a temperature sensing device, said equipment comprising means to position said device in a predetermined position, means for adjusting and generating a desired temperature in said device, and means for sensing the actual temperature of said device.

The present invention further relates to a method of calibration of a temperature sensing device by exposing said device to a desired temperature, the temperature being defined and controlled by means of another temperature sensing unit.

In connection with many types of process surveying or process controlling there is a need for temperature measuring or temperature recording instruments, such as thermometers and temperature recorders, and temperature controlled instruments, such as thermostates. It is common to such instruments that a temperature is to be measured and sensed in a definite and often not very accessible place, and for this purpose a transmitting temperature sensing unit is used, mounted in a suitable holder or probe which may be inserted and located so that the sensing unit is in the desired place. The signal from the sensing unit or sensor is applied e.g. to an indicating or recording instrument, to other signal processing equipment or other equipment to enable it to cause a response according to the temperature in the defined place. For instance in power plants or in engine rooms on ships such instruments are used to a wide extent, and it may often have serious consequences, if the instrument does not operate in a reliable and accurate manner. Therefore, it is required that the instruments are calibrated precisely before being taken into use and, besides, the operational conditions may necessitate that the instruments are checked and re-adjusted at regular intervals.

For this purpose different types of portable calibration equipment have been developed, being capable of generating and maintaining various well-defined temperatures in a chamber or a pocket in which the temperature sensing unit of an instrument may easily be inserted after having been removed from its usual place of use.

From U.S. Pat. No. 3,738,174 issued to Waldron a type of calibration equipment is known based on a metal core defining a chamber or a pocket and which is provided with built-in electric heating wires. By means of controlling equipment comprising a thermosensor in the chamber, a desired temperature may be generated in the chamber, and e.g. the pointer or scale of a thermometer may then be verified and adjusted as needed, when its sensing unit is in the chamber and thus is exposed to a well-defined temperature.

Actually, such a metal core performs rather well, but still has the disadvantage that a substantial period of time is required to stabilize the chamber temperature at a desired, adjusted value, and the heat capacity of the metal core causes the calibraiton operation to be time consuming in particular when an instrument is to be calibrated in a number of succeeding scale points. When it is desired to raise the temperature, the electric resistance wire is heated and the heat dissipates subsequently to the core and through the core to the chamber and then to the sensing unit. Until the desired temperature is reached, the temperature of the heating wire must be substantially higher than the temperature ultimately desired, to dissipate heat into the core. When the desired temperature is reached the heating power is turned down to a lower value and a substantial waiting time must elapse before a stable temperature equilibrium has been reached. The temperature overshoot implies that the operative temperature range of the calibration apparatus is restricted to be well below the temperature tolerable to the wires, and that the time required to step up the temperature by a given interval becomes very long as the calibration temperature approaches the upper limit. The only way to remedy this problem is to manufacture the heating wires from special and costly high-temperature materials. The calibration operation is particularly time consuming when the core temperature is to be re-set from a higher to a lower value in which instance a cooling fan has to be used in order to accelerate a temperature decrease in the core, the fan being built into the calibration equipment. This problem is due to the rather substantial heat capacity of the core.

Core materials such as aluminium and copper are commonly used by reason of good heat conductivity, but these metals cannot withstand very high temperatures having the tendency to glow or oxidize at temperatures being higher than in the range of 500°–600° C. On the other hand, the known metals which may resist these high temperatures, such as stainless steel, have a considerably poorer heat conductivity and are consequently not generally suited, either.

A completely different heating concept is the so called high frequency induction heating. By this method the piece of material to be heated is placed in an alternating electromagnetic field. Provided the material in question is electrically conductive or ferromagnetic the said field will cause eddy currents or respectively alternating magnetization either effect causing heating of said piece.

U.S. Pat. No. 3,377,838 issued to Kanazawa et al. describes an apparatus for measuring transformation characteristics of metallic materials where high frequency induction is used to heat a test specimen. However, this apparatus being well suited for research purposes is not at all applicable for the calibration of temperature sensors for which it was never intended. E.g. the heat chamber is encapsulated in a vacuum vessel making the insertion and removal of a temperature probe impossible during the operation of the instrument. Futher said patent does not explain how the reference sensor should be coupled to the test specimen.

BRIEF DESCRIPTION OF THE INVENTION

It is an object of this invention to provide a portable instrument for the calibration of temperature sensors which is simpler, smaller and cheaper than other known instruments yet capable of a higher accuracy and a wider range of application.

A further object of the invention is to provide an instrument for the calibration of temperature sensors which is faster in use, i.e. capable of providing a desired temperature (higher or lower) reliably with accuracy and stability faster than the instruments in the prior art.

A still further object of the invention is to provide an instrument for the calibration of temperature sensors which causes less disturbance, i.e. heatspilling, to the ambient environment than the instruments in the prior art.

Other objects of the invention will appear form the following detailed description.

In its most preferred embodiment the calibration equipment of the invention comprises a thermo chamber which is conveniently accessible through at least one opening for the insertion or removal of a temperature sensing unit to be calibrated, said chamber being adapted to receive at least one reference sensor and at least one sensor to be calibrated keeping them thermally insulated from the ambient environment to ensure they will quickly obtain equal temperature, the opening(s) of said chamber being closable by a removable lid, wherein connections from the reference sensor(s) and the sensor(s) to be calibrated can be routed from said sensors to the outside of the chamber and wherein the reference sensor may be put into direct contact with the sensor to be calibrated.

In the calibration equipment of the invention the chamber is associated with an HF-ciol capable of generating an alternating magnetic field passing through the chamber, said coil being connected with a tunable HF-generator.

The HF-induction heating produces a uinformly distributed heat input to the material in question contrary to the localized heating by a traditional heating wire. Therefore the massive core which was previously needed to ensure a uniform temperature in the test chamber in the conventional calibration instruments can be substantially reduced, possibly omitted entirely where the units to be calibrated are electrically conductive which is often the case, or the chamber contains some other matter being heatable by HF-induction such as e.g. molten metal. Because of the more uniform heat distribution a better accuracy of the calibration can be obtained.

The HF-induction is generated by transmitting an HF-current through a coil. Hereby the wires of the coil themselves are not heated by the induction and do not need to assume the same temperature as the matter they are heating. The wires do in fact develop heat due to the power loss caused by their electric resistance but their temperature rise can be kept within a moderate range. Thus the wires are preferably kept cold, that is to say they are kept outside the thermal insulation surrounding the temperature chamber. By reason of this, cheaper wires can used and higher temperatures can be obtained than was possible with the conventional technique.

Since the wires can be kept away from the temperature chamber and since the core can be reduced or omitted the heat capacity of the temperature chamber is dramatically reduced and hereby is obtained:
less energy consumption
faster heat-up
faster cool off
lighter and more portable equipment.

As the bulk of material and pieces to be heated is so considerably reduced compared with the instruments of the prior art it is possible to reduce also the amount of thermal insulation and even leave openings in both ends of the chamber without loosing more heat than is lost by the instruments of the prior art.

Electric coils whether in the form of heating wires or in the form of an HF-induction coil may give rise to loss of energy because part of the magnetic field is spread to the surroundings causing heat up or mechanical motion of any pieces of magnetizable material nearby e.g. the instrument housing. One method to prevent spreading the magnetic field is to surround the coil with a casing of magnetizable material. The energy can be better utilized according to one particular embodiment of the invention in which the magnetic field generated by the coil is concentrated and guided through the temperature chamber by means of a magnetizable core of a proper shape provided the HF-induction coil surrounds the magnetic core rather than the temperature chamber.

The temperature reference sensor which can be of any known suitable kind is put into the temperature chamber next to the sensor to be calibrated.

One type of temperature sensor which is well suited as reference sensor is based on the known thermocouple principle where an electric voltage generated in the junction between two different metals is measured, from which voltage the temperature is derived using a known way of calculation.

However, according to one preferred embodiment of the invention applicable when the sensor to be calibrated has an electrically conductive, surface the two pieces of metals forming the thermocouple are not joined directly as in the prior art but each contact the surface of the sensor to be calibrated. The voltage generated hereby obeys the same temperature relation as that of a conventional thermo couple but the temperature represented by this method is the average of the temperatures at the two contact points on the very surface of the sensor to be calibrated. By this method the risk present in conventional methods that the temperature of the reference sensor might differ from the temperature of the sensor to be calibrated is eliminated. Thus a more accurate measurement is obtained and the waiting time usually needed to permit a temperature equilibrium to be reached is practically eliminated.

By using a protective gas in the chamber corrosion or oxidation at high temperatures can be inhibited, permitting higher temperatures and a wider choice of materials to be used in the temperature chamber, e.g. such that are preferable by reasons of price or by reasons of superior performance in other respects (e.g. heat conductivity).

Some figures illustrate the order of magntiude of the advantages gained by the invention. An instrument of the conventional technique similar to Waldron is capable of producing a rate of temperature increase of 0.4 centigrades per second, the heating element taking up a power consumption of 1000 W. The rate of cool-off in the known instrument is 0.3 centigrade per second at 180° C. when the internal fan is used. The instrument of similar size but elaborated according to the present invention is able to increase the temperature at a rate of 2° C./s, the heating element taking up a power consumption of only 50 W. The rate of cool off is 1° C./s at 180° C. without any fan.

Finally the need for inspection and maintenance of the equipment is considerably less than in known equipments with metal core and electric heating elements.

BRIEF DESCRIPTION OF THE DRAWINGS

The invention will be more fully understood by way of examples illustrated in the drawings, showing in FIG. 1 side elevated section through the centre of the temperature chamber showing also the HF-coil and the particular temperature reference sensor, FIG. 2 section similar to FIG. 1 but with a different embodiment of the temperature reference sensor, FIG. 3 section similar to FIG. 1 but with a different embodiment of the temperature reference sensor, FIG. 4 section similar to FIG. 1 but with a different embodiment of the temperature couple reference sensor, FIG. 5 section similar to FIG. 1 but with the sensor placed in a metal casing, FIG. 6 section similar to FIG. 1 but with a different embodiment of the temperature reference sensor, FIG. 7 top plan view showing the temperature chamber and the HF-coil and the magnetic core according to a particular embodiment of the invention, and FIG. 8 block diagram of the electric circuity associated with the calibration instrument,

DESCRIPTION OF PREFERRED EMBODIMENTS

In the figures the embodiments of the invention are diagrammatically represented including only those parts which are essential to an understanding of the invention.

Figure 1:
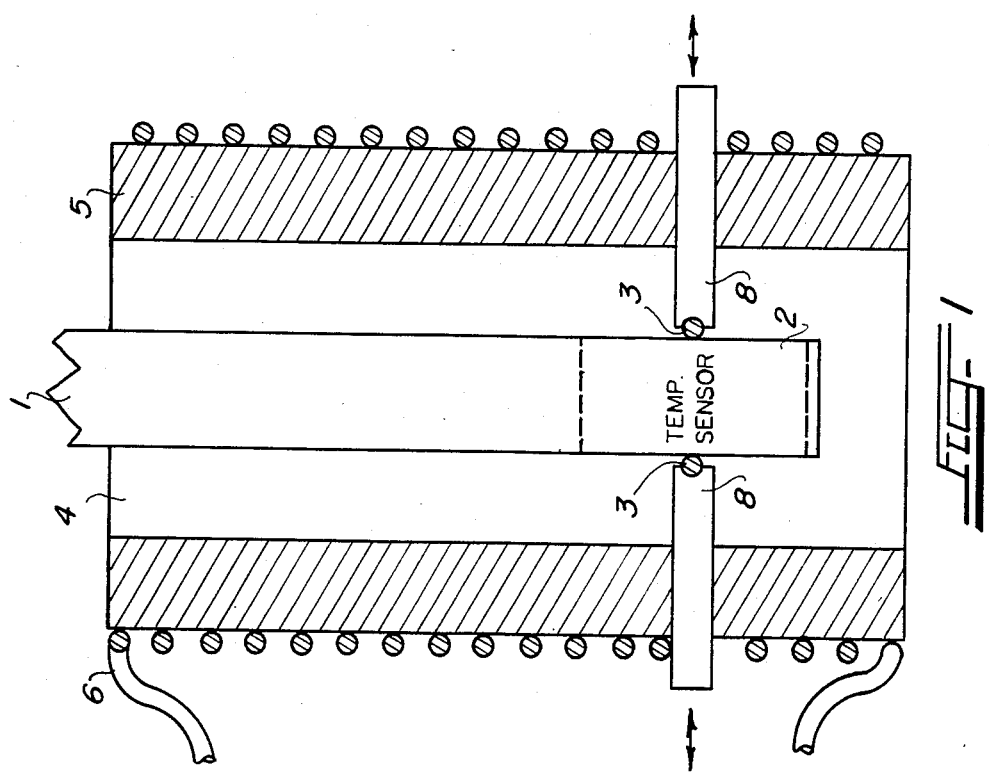

In FIG. 1 showing one embodiment of the invention the temperature chamber is indicated by 4. The sensor to be calibrated generally indicated by 1 with its temperature sensing portion or part indicated by 2 is placed inside the temperature chamber 4. The chamber is surrounded by heat insulative material 5 and surrounded by an HF-induction coil 6. The temperature reference sensor is based on the known thermocouple principle which in essence utilizes the phenomenon that a voltage is generated at the contact point between two different metals or metal alloys, the voltage having a known relationship to the temperature at the contact point. Various metals or metal alloys can be used, e.g. the first element can be a Nickel-Chromium alloy, the other element then being a Nickel-Aluminium alloy. The active elements of the thermocouple are indicated by 3. In the embodiment in FIG. 1 the thermocouple elements 3 are mounted on rods 8 that are movable so that they can be pushed into contact with the sensor outer surface. The rods 8 pass through openings in the insulative material 5 and between the windings of the coil 6 so that they are maneuverable from outside of the temperature chamber.

The contact elements 3 in the embodiment in FIG. 1 are shaped as pins, the axis of each pin extending perpendicular to the axis of the temperature chamber. Hereby a practical advantage is gained, in that the positioning of the sensor to be calibrated is not critical for obtaining the proper contact. Other shapes of the contact elements are equally well possible, e.g. ballpoint shape, pinpoint shape or flat disc shape, since the function of the thermocouple neither depends upon the shape nor upon the size of the contact point.

Figure 2:
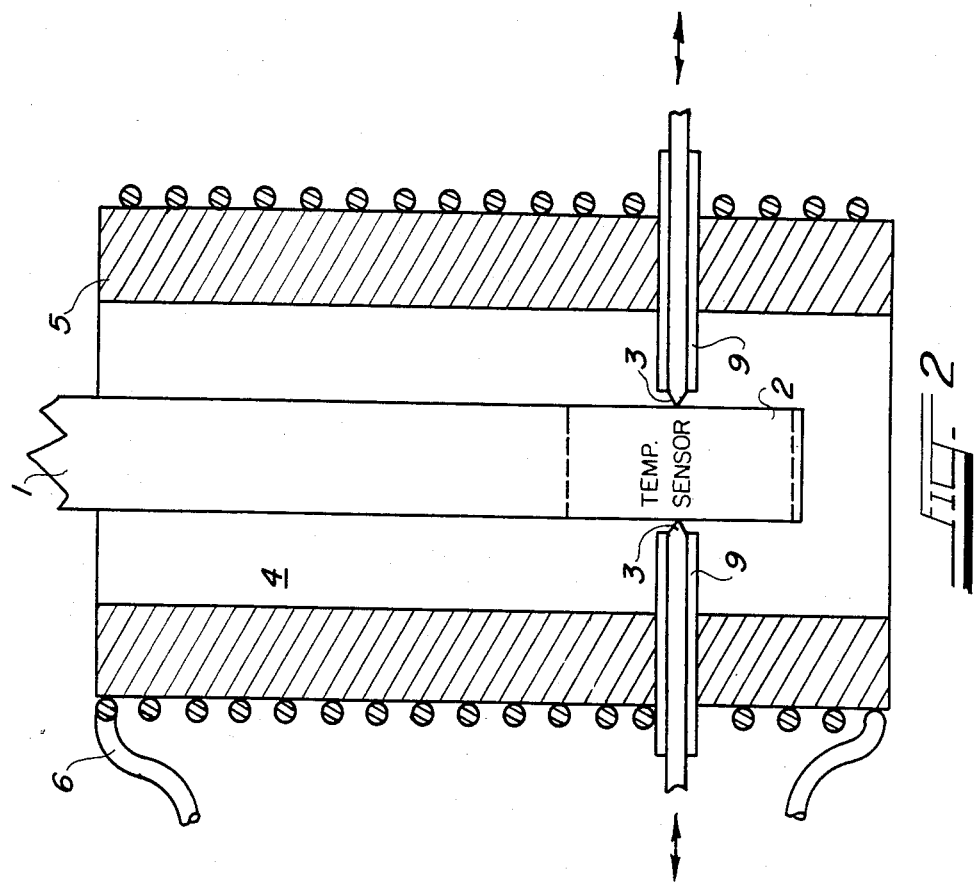

In FIG. 2 another embodiment of the invention is shown differing from the one in FIG. 1 by the mounting of the thermocouple elements. In FIG. 2 the thermocouple elements are mounted in tubular casings 9 which e.g. can be made from glass or ceramic material. Also here the rods pass through openings in the insulative material 5 and between the windings of the coil 6 to be maneuverable from the outside so they can be pushed towards the sensor outer surface.

In FIG. 3 another embodiment of the invention is shown in which the temperature chamber has no side holes. In this case the thermocouple elements 3 are mounted on arms 10 pivotable to enable the thermo couple elements to be pressed toward the sensor outer surface. The arms may be spring-loaded by a spring 11 so as to ensure a firm contact between the thermocouple elements and the sensor outer surface.

In FIG. 4 another embodiment of the invention is shown in which the temperature chamber is similar to that shown in FIG. 3 but the mounting of the thermocouple elements differs. Here the thermocouple elements 3 are held against the sensor surface by an annular sleeve 12. The electric connection of the thermocouple elements is passed to the outside of the temperature chamber through cables 7.

In FIG. 5 another embodiment of the invention is shown similar to that in FIG. 1 but in this case comprising also a metal casing 13 housing the sensor 1. The thermocouple elements in this case do not contact the sensor surface directly but rather the outer surface of the casing 13. This embodiment is particularly advantageous where the sensor to be calibrated 1 has a surface which is not electrically conductive as the extra metal casing 13 receives the HF-magnetic energy converting this to heat and further serves to provide contact between the thermocouple elements 3. The metal casing 13 further has the capability of distributing the temperature to obtain uniform heating of the sensor 1. Since the HF-induction heating by its very nature produces a uniform heating, the casing 13 does not have to be as massive as the metal core used in the instruments of the prior art.

In FIG. 6 another advantageous embodiment of the invention is shown in which the temperature reference sensor does not need electric contact with the surface of the sensor to be calibrated 1. The temperature reference sensor, which may be a thermocouple as described above or an electric resistor e.g. made of platinum such as the type commonly known as a PT 100 or some other known type of temperature sensor, is brought into close contact with the sensor to be calibrated only to ensure a unifom heat distribution among these to sensors. In the figure the temperature reference sensor is passed through a hole in the side of the temperature chamber but it may equally well be put down from the top opening into the temperature chamber in which case the chamber needs no hole in the side.

In FIG. 7 another advantageous embodiment of the invention is shown differing from those shown in the above figures by the arrangement of the HF-induction coil. In the embodiment in FIG. 7 the electric coil 6 does not immediately surround the temperature chamber but is rather mounted on a coil spool 14 surrounding a core 15 of magnetic material such as ferrite. The core shown in the FIG. 7 is of the form generally described as a C-type core. The core concentrates the magnetic field and routes it to the temperature chamber which is placed in the opening between the poles of the core. By this embodiment no magnetic flux is spilled to the outside but all of the magnetic field is concentrated into the point of use. The form of the temperature chamber and temperature reference sensor shown here is similar to that of FIG. 3 but could be any of these explained above.

In FIG. 8 is shown a block diagram of the circuity needed to operate the instrument or perform the method. A setting unit 17 is capable of receiving a desired temperature value or a programmed pattern of temperature variation which is typically entered by the operator. The unit 17 is capable of storing these data and passing them on to other units as explained below.

An HF-power generator 19 generates a powerful electric signal which is routed to the HF-induction coil 6. The output power of the power generator 19 is controllable by means of a control signal applied to a control input.

The output signal from the temperature reference sensor is passed onto a signal processing unit 20 providing a suitable zero point compensation, suitable filtering and suitable amplification. If the temperature reference sensor is of the thermocouple type containing wires of two different metals or metal alloys 7 the output voltage generated does not represent the absolute temperature but rather the temperature difference between the two junction points, one of these junction points 3 as described being the double contact points of the active temperature reference sensor, the other junction point being in the signal processing unit.

If the temperature reference sensor is of another type the signal processing unit 20 is adapted as necessary to the particular sensor used, said unit generally providing zero-point compensation, filtering and amplification means.

An output signal from the signal processing unit 20 is routed onto a conversion unit 21. The signal received by the unit 21 bears a known relation but not necessarily a linear relation with the temperature at the contact points 3. This signal is converted by the conversion unit to a signal having a linear relationship to the temperature measured at the temperature reference sensor.

The conversion may e.g. be performed by electronic circuitry or by a microprocessor.

The linear output signal from 21 is passed onto a control unit 18 having two inputs. The control unit 18 may e.g. comprise a differential amplifier and an integrator. At the other input the control unit 18 receives a signal representing the setting of desired temperature. The unit 18 compares these two inputs and in case there is a difference between the desired and the measured temperature the control unit 18 produces a suitable correcting control signal which is passed on to control the power generator 19.

In FIG. 8 is further shown a read out means 16 which may be e.g. a display indicating a temperature. By means of a switch 22 the read out means may at wish be connected to indicate the temperature set or be switched to read the temperature as measured. According to an alternative embodiment of the invention not shown in FIG. 8 the read out means 16 might also have two displays both being connected simultaneously, one showing the temperature set and the other the temperature as measured. Instead of a display the unit 16 could also have an output connection which could be connected to some other read out or data processing means.

The invention is not limited to the embodiment illustrated in the drawing but comprises on the contrary any other embodiment that may occur to a person skilled in the art without departing from the spirit of this invention, and the scope of the invention should be determined only as limited by a proper interpretation of the terms used in the following claims.

I claim:

1. An equipment for the calibration of a temperature sensing device, said equipment comprising means for retaining said temperature device in a predetermined position, means for producing a predetermined temperature in said device, and means for sensing the actual temperature of the surface of said device, or the surface of a heat-conductive casing in direct contact with said device, said surface being formed of magnetizable or electrically-conductive material, said means for producing the predetermined temperature comprising an induction coil, said coil generating a magnetic field when said coil is fed with an alternating current to cause heating of said surface of said magnetizable or electrically conductive material, said induction coil being fed from a controllable AC-generator controlled by a signal from a control unit, said control unit having a first and a second input, said first input receiving a signal representing said predetermined temperature, and said second input receiving a signal representing the actual temperature, said control unit including means for comparing said two input signals and producing therefrom a control signal for said AC-generator, said means for sensing the actual temperature of said device comprising a temperature sensing means serving as temperature reference sensor and being adapted to be placed in heat conductive contact, with said surface.

2. The equipment of claim 1 wherein said means for retaining temperature sensing device to be calibrated comprises a chamber with walls surrounded by said induction coil in such way that said magnetic field passes through the chamber.

3. The equipment of claim 2 wherein said walls include thermally insulative material.

4. The equipment of claim 2 wherein the chamber comprises sidewalls, a bottom wall and a top with an opening to permit the insertion of a temperature sensing device to be calibrated.

5. The equipment of claim 4 wherein the bottom wall has at least one opening to permit venting of the chamber.

6. The equipment of claim 1 wherein thermal insulation is disposed between said coil and said temperature sensing device to be calibrated.

7. The equipment of claim 1 wherein the temperature sensing device to be calibrated is placed inside a tubular casing of electrically conductive material such as stainless steel.

8. The equipment of claim 1 or 7 where the reference sensor is a thermocouple.

9. The equipment of claim 1 where the reference sensor is an electric resistor.

10. The equipment of claim 1 wherein said means for sensing the actual temperature of said device to be calibrated comprise a first electrical conductor made of a first metallic material and a second electrical conductor made of a second metallic material, both conductors being adapted to be placed in electrically conductive contact at two separate contact points with either the outer surface of said sensor to be calibrated or with the outer surface of a casing adapted to receive said sensor to be calibrated, said contact points establishing thermocouples, each of said electrical conductors being connected by way of electrically conductive wires to signal processing and conversion equipment, said signal processing and conversion equipment producing said signal which is fed to said second input of said control unit.

11. The equipment of claim 10 where each of the two elements constituting the thermocouple is mounted on a sleeve holding both elements in contact with the casing or the sensor to be calibrated.

12. The equipment of claim 10 where each of the two elements constituting the thermocouple is mounted on a rod that can be pushed towards the casing or the sensor to be calibrated.

13. The equipment of claim 10 where each of the two elements constituting the thermocouple is mounted in a tubular and electrically non-conductive casing that can be pushed towards the casing or the sensor to be calibrated.

14. The equipment of claim 10 where each of the two elements constituting the thermocouple is mounted on a support arm, said arm being pivotally mounted for shifting said elements into contact with the casing or the sensor to be calibrated.

15. The equipment of claim 1 wherein said field is generated in a core of magnetizable material, said core guiding the magnetic field to pass through said position for positioning said temperature sensing device to be calibrated.

16. A method for the calibration of a temperature sensing device, comprising placing first and second electrical conductors in direct contact with the surface of said device or with the surface of a heat-conductive casing in heat-conductive contact with said device, said first and second electrical conductors being made of first and second metallic materials, respectively, and being placed in electrically-conductive contact with said surface at two different contact points, said two contact points establishing thermocouples, heating said device by the induction of an alternating magnetic field passing through said device or said casing, connecting said electrical conductors to said signal processing and conversion equipment to provide a signal representative of the average temperature at said contact points, and comparing the response of said temperature sensing device with said signal for calibration of said device.

* * * * *